US009159469B2

(12) United States Patent
Fogg et al.

(10) Patent No.: US 9,159,469 B2
(45) Date of Patent: Oct. 13, 2015

(54) UMBILICAL

(75) Inventors: David Fogg, Newcastle Upon Tyne (GB); Xiaoxue An, Newcastle Upon Tyne (GB); Dave Bromfield, Whitley Bay (GB); Alan Dobson, Newcastle Upon Tyne (GB)

(73) Assignee: TECHNIP FRANCE (FR)

( * ) Notice: Subject to any disclaimer, the term of this patent is extended or adjusted under 35 U.S.C. 154(b) by 94 days.

(21) Appl. No.: 13/640,460

(22) PCT Filed: Apr. 14, 2011

(86) PCT No.: PCT/GB2011/050741
§ 371 (c)(1),
(2), (4) Date: Nov. 16, 2012

(87) PCT Pub. No.: WO2011/131969
PCT Pub. Date: Oct. 27, 2011

(65) Prior Publication Data

US 2013/0048373 A1 Feb. 28, 2013

(30) Foreign Application Priority Data

Apr. 19, 2010 (GB) .................................. 1006461.6

(51) Int. Cl.
*H02G 9/00* (2006.01)
*H02G 9/06* (2006.01)
*H01B 7/04* (2006.01)

(52) U.S. Cl.
CPC ...................................... *H01B 7/045* (2013.01)

(58) Field of Classification Search
CPC ....................................................... H01B 7/045
USPC ........... 174/70 R, 113 R, 128.1, 88 R, 102 A; 166/345, 367; 385/101
See application file for complete search history.

(56) References Cited

U.S. PATENT DOCUMENTS 4,196,307 A * 4/1980 Moore et al. .................... 174/47
4,259,544 A 3/1981 Litauer ......................... 174/102

(Continued)

FOREIGN PATENT DOCUMENTS

EP 1 691 378 A2 8/2006
FR 800164 6/1936

(Continued)

OTHER PUBLICATIONS

International Search Report dated Dec. 12, 2011 issued in corresponding international application No. PCT/GB2011/050741.

(Continued)

*Primary Examiner* — Angel R Estrada
*Assistant Examiner* — Dimary Lopez Cruz
(74) *Attorney, Agent, or Firm* — Ostrolenk Faber LLP

(57) ABSTRACT

An umbilical for use in the offshore production of hydrocarbons, and in particular a power umbilical for use in deep water applications, is described comprising a plurality of longitudinal strength members, wherein at least one longitudinal strength member comprises rope comprising high strength organic fibers having a tensile modulus >100 GPa. In this way, the or each longitudinal strength member being such a rope achieves the synergistic benefit of favorable mechanical properties in the axial direction, with weight reduction and other favorable mechanical properties, especially during tensioning or the like of the umbilical, more especially during manufacture, installation and/or repair. With weight reduction, longer umbilicals for deeper water can be made and used.

11 Claims, 5 Drawing Sheets

(56) References Cited

U.S. PATENT DOCUMENTS

| | | | | |
|---|---|---|---|---|
| 4,317,000 | A * | 2/1982 | Ferer | 174/70 R |
| 4,861,947 | A | 8/1989 | Altermatt et al. | 174/113 |
| 4,956,523 | A | 9/1990 | Pawluk | 174/107 |
| 6,472,614 | B1 | 10/2002 | Dupont et al. | |
| 6,493,491 | B1 | 12/2002 | Shen et al. | |
| 6,612,370 | B1 * | 9/2003 | Jahnsen et al. | 166/367 |
| 7,798,234 | B2 * | 9/2010 | Ju et al. | 166/367 |
| 8,186,911 | B2 * | 5/2012 | Figenschou | 405/169 |
| 2006/0193572 | A1 | 8/2006 | Mjelstad | 385/101 |
| 2007/0251694 | A1 | 11/2007 | Ju et al. | |
| 2009/0120632 | A1 * | 5/2009 | Worman et al. | 166/65.1 |
| 2011/0067881 | A1 * | 3/2011 | Blake | 166/352 |

FOREIGN PATENT DOCUMENTS

| | | | |
|---|---|---|---|
| GB | 2 316 990 | | 3/1998 |
| GB | 2 326 177 | | 12/1998 |
| WO | WO 93/17176 | | 9/1993 |
| WO | WO 2004/071865 | A2 | 8/2004 |
| WO | WO 2004/077440 | A1 | 9/2004 |
| WO | WO 2005/124095 | | 12/2005 |
| WO | WO 2006/005689 | A1 | 1/2006 |
| WO | WO 2009/112664 | A2 | 9/2009 |

OTHER PUBLICATIONS

Search Report dated Jul. 8, 2010 issued in corresponding UK Patent Application GB1006461.6 (1 page).

International Preliminary Report on Patentability and Written Opinion dated Oct. 23, 2012 issued in corresponding International Patent Application No. PCT/GB2011/050741 (6 pages).

* cited by examiner

| Fibre | Chemical structure | | Strength GPa | Modulud GPa | Specific gravity g/cm3, |
|---|---|---|---|---|---|
| Technora | 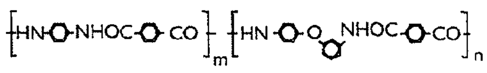 | co-poly-(paraphenylene/3,4'-oxydiphenylene terephthalamide) | 2.8 | 109 | 1.44 |
| Twaron | 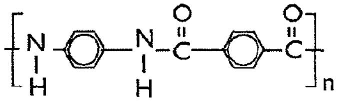 | para-aramid fiber :poly-paraphenylene terephthalamide | 2.8 | 109 | 1.44 |
| Zylon | 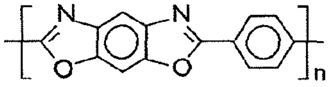 | rigid-rod isotropic crystal polymer: Poly (p-phenylene-2, 6-enzobisoxazole) (PBO) | 5.8 | 180-270 | 1.56 |
| Vectran® | 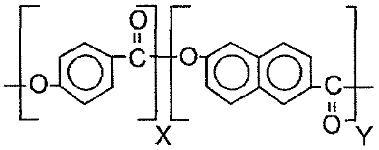 | polyester based liquid crystal fiber | 3.0-3.2 | 103 | 1.41 |
| Kevlar 49 | 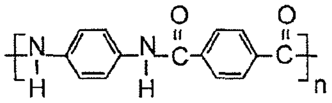 | Poly (p-phenylene terephthalate | 2.8 | 109 | 1.44 |

Fig. 4

| Item | Tensile GPa | Modulus GPa | El % | Density $g/cm^3$ |
|---|---|---|---|---|
| ZYLON® AS | 5.8 | 180 | 3.5 | 1.54 |
| ZYLON® HM | 5.8 | 270 | 2.5 | 1.56 |
| P-aramid (HM) | 2.8 | 109 | 2.4 | 1.45 |
| Polyester | 1.1 | 15 | 25 | 1.38 |
| Steel | 2.8 | 200 | 1.4 | 7.8 |
| Carbon fibre T-300 | 3.5 | 230 | 1.0 | 1.76 |

Fig. 5

| Rope | OD mm | BL kN | Modulus GPa | Mass weight g/m |
|---|---|---|---|---|
| SDSS tube | 15.1/1.2 | 42.3 | 200 | 360 |
| Technora 12 strand | 15.3 | 213 | 75 | 193.7 |
| Spectro 12 strand | 18.4 | 209 | | 179.3 |
| Spectro 12 strand, coated | 15.3 | 173 | | 134.8 |
| Technora double braid | 15.3 | 156 | | 183.5 |
| Twaron (D2200)rope | 11.2 | 107 | 96-124 | 120 |
| ZYLON® 1x7 strand | 6.6 | 90 | 206 | 36.7 |
| ZYLON® 7x19 rope | 14.35 | 280 | 185-190 | 142.2 |
| PC strand HDPE sheath | 15.5 | 279 | 185-205 | 1090 |
| Vello ® umbilical rod | 6.5 | 45 | 155 | 40 |
| CFCC 1x7 | 12.5 | 184 | 155 | 145 |
| NFCC 1x7 high modulus | 12.5 | 109 | 206 | 182 |

Fig. 6

| Rope | Dia. mm | UTS MPa | Modulus GPa | Elongation at break % | Mass weight g/m |
|---|---|---|---|---|---|
| Technora | 13.0 | 942 | <100 | 2-3% | 150 |
| Kalvar or Twaron high modulus rope 7x7 | 11.2 | 1086 | 96-124 | 1-1.8% | 120 |
| Zylon 1x7 rope | 6.6 | 2632 | 207 | <1% | 36.7 |
| Zylon 7x19 rope | 14.35 | 1732 | 190 | <1% | 142.2 |
| Vectra rope | 13 | 942 | 90-100 | 3.3-5% | 150 |
| PC strand HDPE sheath | 15.5 | 1670 | 200 | 6.1 (600 mm) | 1090 |

Fig. 7

UMBILICAL

CROSS REFERENCE TO RELATED APPLICATIONS

The present application is a 35 U.S.C. §371 National Phase conversion of PCT/GB2011/050741, filed Apr. 14, 2011, which claims benefit of British Application No. 1006461.6, filed Apr. 19, 2010, the disclosure of which is incorporated herein by reference. The PCT International Application was published in the English language.

TECHNICAL FIELD OF THE INVENTION

The present invention relates to an umbilical for use in the offshore production of hydrocarbons, and in particular to a power umbilical for use in deep water applications.

BACKGROUND OF THE INVENTION

An umbilical consists of a group of one or more types of elongated or longitudinal active umbilical elements, such as electrical cables, optical fibre cables, steel tubes and/or hoses, cabled together for flexibility, over-sheathed and, when applicable, armoured for mechanical strength. Umbilicals are typically used for transmitting power, signals and fluids (for example for fluid injection, hydraulic power, gas release, etc.) to and from a subsea installation.

The umbilical cross-section is generally circular, the elongated elements being wound together either in a helical or in a S/Z pattern. In order to fill the interstitial voids between the various umbilical elements and obtain the desired configuration, filler components may be included within the voids.

ISO 13628-5/API 17E "Specification for Subsea Umbilicals" provides standards for the design and manufacture of such umbilicals.

Subsea umbilicals are installed at increasing water depths, commonly deeper than 2000 m. Such umbilicals have to be able to withstand severe loading conditions during their installation and their service life.

The main load bearing components in charge of withstanding the axial loads due to the weight (tension) and to the movements (bending stresses) of the umbilical are: steels tubes (see for example U.S. Pat. No. 6,472,614, WO93/17176, GB2316990), steel rods (U.S. Pat. No. 6,472,614), composite rods (WO2005/124095, US2007/0251694), steel ropes (GB2326177, WO2005/124095), or tensile armour layers (see FIG. 1 of U.S. Pat. No. 6,472,614).

The other elements, such as the electrical and optical cables, the thermoplastic hoses, the polymeric external sheath and the polymeric filler components, do not contribute significantly to the tensile strength of the umbilical.

The load bearing components of most umbilicals are made of steel, which adds strength but also weight to the structure. As the water depth increases, the suspended weight also increases (for example in a riser configuration) until a limit is reached at which the umbilical is not able to support its own suspended weight. This limit depends on the structure and on the dynamic conditions at the (water) surface or 'topside'. This limit is around 3000 m for steel reinforced dynamic power umbilicals (i.e. umbilical risers comprising large and heavy electrical power cables with copper conductors).

However, it is desired to create power umbilicals for ultra-deep water (such as depth (D)>3000 m). Such umbilicals comprise very heavy copper conductor cables and must be strongly reinforced to be able to withstand their beyond-normal suspended weight and the dynamic installation and operating loads.

An easy solution would be to reinforce such umbilicals with further steel load bearing strength members, such as the rods, wires, tubes or ropes described above. However, due to the important specific gravity of steel, this solution now also adds a significant weight to the umbilical and does not solve the problem in considerable extended lengths. For example, in static conditions, the water depth limit of such a solution is around D=3200 m, where the maximum tensile stress in the copper conductors of the power cables (being weak point of the structure) reaches its yield point (at the topside area close to the surface). However, in any dynamic conditions, this depth limit is naturally lower because of the fatigue phenomenon. Furthermore, such steel reinforced umbilicals are very heavy and require evermore powerful and expensive installation vessels.

A suggested solution to this problem consists in using composite material strength members shown in WO2005/124095 and US2007/0251694. However, such umbilicals are difficult to manufacture and so are very expensive.

An object of the present invention is to overcome one or more of the above limitations and to provide an umbilical which can be used at greater water depths (up to 3000 m and more) and/or under greater or more severe dynamic loading.

SUMMARY OF THE INVENTION

According to one aspect of the present invention, there is provided an umbilical comprising a plurality of longitudinal strength members, wherein at least one longitudinal strength member comprises rope comprising high strength organic fibres having a tensile modulus >100 GPa.

In this way, the or each longitudinal strength member being such a rope (or 'rope strength member(s)') achieves the synergistic benefit of favourable mechanical properties in the axial direction, with weight reduction and other favourable mechanical properties, especially during tensioning or the like of the umbilical, and especially during manufacture, installation and/or repair. With weight reduction, longer umbilicals for deeper water can be made and used.

Preferably, the or each rope strength member extends wholly or substantially the length of the umbilical, more preferably as a continuous and non-changing strength member.

Such rope strength member(s) of the present invention provide at least some, optionally all, of the load bearing of the umbilical in use, and are generally formed as windings in the umbilical along with the other umbilical elements, generally not being the core of the umbilical.

In one embodiment of the present invention, the rope has a strength to weight ratio of at least $1.0\times10^6$ Nm/kg. Preferably, the rope has a strength to weight ratio higher than $1.5\times10^6$ Nm/kg, and more preferably higher than $2.0\times10^6$ Nm/kg.

According to another embodiment of the present invention, the umbilical comprises a plurality of longitudinal strength members comprising rope comprising high strength organic fibres as defined herein. Optionally, each such rope comprises one or more of the materials of the group comprising: aromatic polyamide (aramid) fibre, aromatic polyester fibre, liquid crystal fibre, high performance polyethylene fibre, and aromatic heterocyclic polymer fibre (PBO); preferably aromatic heterocyclic polymer fibre (PBO). Optionally, one or more of such rope strength members may be formed from fibres different from one or more other such rope strength members.

Preferably, the umbilical comprises one or more longitudinal strength members comprising rope wherein the fibres have a tensile modulus >150 GPa, and optionally >180 GPa or >200 GPa.

The or each rope generally comprises a plurality of strands, for example being at least 5 or at least 10 strands, optionally in the range of 10-50 strands. Rope formed in strands is well known in the art, and can be contrasted with ‘solid’ strength members generally formed of a single solid material, or formed of fibres needed to be conjoined by a resin or other adhesive to form a “substantially solid” single entity to provide enough strength.

In one embodiment of the present invention, the rope comprises one or more of the materials of the group comprising: aromatic polyamide (aramid) fibre, aromatic polyester fibre, liquid crystal fibre, high performance polyethylene fibre, and aromatic heterocyclic polymer fibre (PBO).

Preferably, the rope comprises aromatic heterocyclic polymer fibre (PBO), more preferably Zylon® rope.

In this regard, typical tensile strengths values for certain materials able to be used are:

| Material | Tensile Strength (MPa) | Tensile Modulus (GPa) | Specific Tensile Strength (Nm/kg) |
|---|---|---|---|
| Liquid crystal fibre—Vectran | 2900 | 103 | $2.07 \times 10^6$ |
| Aramid fibre—Technora (Available from Teijin) | 3440 | 79 | $2.47 \times 10^6$ |
| Aramid fibre—Kevlar 49 (from DuPont) or Twaron D2200 ( from Teijin) | 3600 | 102 to 110 | $2.5 \times 10^6$ |
| High Performance Polyethylene fibre—Dyneema | 2620 | 107 | $2.70 \times 10^6$ |
| Aromatic Heterocyclic Polymer fibre PBO—Zylon ® | 5500 | 180 | $3.52 \times 10^6$ |
| High Performance Polyethylene fibre—Spectra | 3510 | 270 | $3.62 \times 10^6$ |

Such suitable high strength organic fibre formed ropes are light, and have high strength and high modulus strength, and include various high strength low stretch synthetic fibre ropes made with either Zylon® fibre or aramid fibres, such as Kelvar or Twaron high modulus fibre, or liquid crystal fibre, such as Vectra fibre, or other high strength and high modulus synthetic fibres.

Kelvar fibres, such as K-29 and high modulus K-49 fibres, are known.

The Twaron and Technora para-aramids also offer a combination of properties such as high strength, low weight, and high modulus (similar to Kelvar, such as Kevlar 49). Due to this combination of properties, the aramids fibres are used in protective garments. Twaron D2200 fibre is a particularly high modulus fibre (110-115 GPa) compared with normal standard aramid fibres. The aramid fibres have high strength and high modulus, good chemical and hydrolysis resistance, high temperature resistance, no corrosion, good dimensional stability, are non-magnetic and non-conductive, and light in weight.

Vectran is a high-performance thermoplastic multifilament yarn spun from Vectra® liquid crystal polymer (LCP). The fibre has high strength and modulus; excellent creep resistance and abrasion resistance; low moisture absorption and coefficient of thermal expansion (CTE) and high impact resistance.

The Zylon® fibre is a trade name of Poly (p-phenylene-2, 6-benzobisoxazole) (PBO) fibre which is a rigid-rod isotropic crystal polymer. It has a strength and modulus almost double that of some para-aramid fibres. The PBO molecule is generally synthesized by condensing 4,6-diamino-1,3-benzenediol dihydrochloride with terephthalic acid (TA) or a derivative of TA such as terephthaloyl chloride in a poly-phosphoric acid (PPA) solution. “Zylon” is a registered trademark of Toyobo Co. Ltd. in Japan.

It is understood that the generally excellent mechanical properties of high strength polymer fibres are a result of the rigid nature of the polymer molecules in solution, which causes the molecules to align in the form of a nematic liquid crystal phase as described above. During the spinning of the fibre, the molecules are further aligned parallel to the fibre axis, and coagulation ensures that this high degree of orientation is maintained in the polymer fibre.

The accompanying FIGS. 4 and 5 are tables that list some properties of several high strength and high modulus synthetic fibres for forming rope suitable for the present invention, both generally in FIG. 4 and for some specific fibre commercial products in FIG. 5. Then, the accompanying FIGS. 6 and 7 are tables that list some properties of several high strength and high modulus ropes suitable for the present invention.

The Handbook of composites by Georges Lubin et al (1998) defines ‘aramid fibre’ as the generic term for a specific type of ‘aromatic polyamide fibre’. It states that the US Federal Trade Commission defines an aramid fibre as “a manufactured fibre in which the fibre-forming substance is a long-chain synthetic polyamide in which at least 85% of the amide linkages are attached directly to two aromatic rings”. Thus, in an aramid, most of the amide groups are directly connected to two aromatic rings, with nothing else intervening.

A rope usable with the present invention may comprise of many levels of components, and may be made by many fibres and defined as a structural element constructed by twisting all components in hierarchical order. The rope can be ‘bare or jacket’. Jacketed ropes have a polymer extruded jacket for maximum abrasion resistance, and for improving resistance to hydrolysis, such as a polyurethane or polyethylene jacket.

The rope can be made of two or more different fibres. The fibres or yarn may be treated by a surface finishing process, such as resin or urethane impregnation technology or other coating technology, before they are put into the rope manufacturing process to further improve the fibre properties including of the resistance to hydrolysis.

The umbilical strength of such ropes can be provided by various rope structures depending on the application and size required, such as 1×7, 1×19 and 7×19. One simple rope structure is a 1×7 strand which consists of 7 strands. Each strand contains many yards, and each yard contains many fibres. For example, a typical 7 strand OD6.7 mm Zylon® rope has 7 strands; each strand contains approximately 27 yarns. Each yarn contains up to 1000 HM fibres. An OD14.35 mm 19 strands rope could have 41 yarns in each strand. Each yarn may contain approximately 1000 high modulus (HM) Zylon® fibres.

Working as a load carrying element, the rope strength member(s) can be added in any umbilical system and various cross-sections of umbilical, as required. The rope(s) can be located in any bundles or sub-bundles as individual rope that is distributed within the umbilical cross-section, or adjacent to each other, or in combination together, or bundled with other components together as a sub-bundle. It may also be possible to locate adjacent to each other within a filler matrix. Such ropes could also be located in the centre of umbilical cross section either as an individual single strength rope or as numbers of strength ropes combination.

Such rope(s) can be added within the umbilical cross-section as many as required without limitation. Such rope(s) can be assembled in the same umbilical manufacturing processes as conventional components. They could also be assembled as a combination bundle before an umbilical manufacturing process.

A pre-stretch or pre-deformation process may need to be applied for the or each rope during or before any lay up process. The or each rope can be in-line joined during the umbilical manufacture process using joint technology. For example, a rope can be pre-stretched in a process line where the rope passes across or between two stretch wheels with applied tension in a range of less 10% break load; then the rope is taken up by a delivery reel. The pre-stretch process can also be added into the rope manufacturing process as a final procedure of the rope manufacturing, or added into the umbilical manufacturing process as a pre-procedure for the umbilical manufacturing process.

An umbilical comprising rope strength member(s) as defined herein also makes repair of the umbilical easier. For example, whenever a repair operating or in-line joint operating is required, the rope can be joined by one of three methods as described below:

(a) A splice technology where the two ends of joined ropes splice together. The overall splice length will depend on the rope size and it will maintain the similar or slight larger diameter of the original rope. After the splice, a rope surface will be first wrapped by a water resistant type and a heat insulated tape; then finally an outer sheath covers it and seals the repair region.

(b) A resin filling technology wherein in-line joint socket is inserted between two joined ropes, and the two ends of the joined ropes are inside this socket and filled with special resin.

(c) An adhesion technology in which the surface of two ends of the joined rope are special treated first, and then, those two ends of the joined ropes are stuck together using glue. The glues and a relative primer or clean solution are chosen according to the fibre materials of the rope. After the splice, the rope surface is then wrapped by a water resistant type and a heat insulated tape; then finally an outer sheath covers it and seals the repair region.

According to another embodiment of the present invention, at least one rope strength member, optionally a plurality of the rope strength members, is enclosed in a tube or sheath. The or each tube or sheath may comprise one or more of the materials of the group comprising: carbon steel, stainless steel or extruded polymer. Such a tube can provide a watertight enclosure to wholly or substantially prevent access of water, in particular seawater, to the rope. Thus, where the properties of the rope could be affected by the presence of water, in particular seawater, the use of an enclosing tube provides the further benefit of overcoming such problems. In particular, if the rope could be affected by one or more of: aging, fatigue resistance, temperature resistance and/or corrosion resistance, the use of an enclosing tube around the rope minimises and optimally prevents any such degradation of the properties of the rope, thereby increasing the reliability of the rope which is not open or otherwise available to inspection once installed and/or in use.

The term "strength to weight ratio" as used herein relates to the specific tensile strength which is also equal to ratio between the tensile strength and the density.

The term "tensile strength" as used herein is defined as the ultimate tensile strength of a material or component, which is maximum tensile force that the material or component can withstand without breaking.

The term "fatigue resistance" as used herein relates to the resistance to repeated application of a cycle of stress to a material or component which can involve one or more factors including amplitude, average severity, rate of cyclic stress and temperature effect, generally to the upper limit of a range of stress that the material or component can withstand indefinitely.

The term "temperature resistance" as used herein relates to the ability of the strength member to withstand changes in its temperature environment. For example, they can be significantly higher temperatures near to the topside of a riser umbilical inside a hot I-tube or J-tube.

The term "corrosion resistance" as used herein relates to the resistance to decomposition of the strength member following interaction with water. The term "corrosion" is applied to both metallic and non-metallic materials. The hydrolysis ageing of polymeric materials is considered as a corrosion phenomenon.

According to another embodiment of the present invention, the or each rope strength member of the present invention is wound helically or in a S/Z pattern along the umbilical. More preferably, the or each such rope strength member has a constant or S/Z pattern winding along the umbilical, in particular a constant pitch or turn or wind, which allows use of the same spiralling equipment or machine to wind the whole length of the rope strength member along the length of the umbilical.

Generally, the present invention involves providing an umbilical having both a high tensile strength and a high compressive strength. For example, the topside or surface end connection of umbilicals such as dynamic risers, which generally involve a combination of high tension and bending (which can lead to rapid fatigue damage), can be provided with higher tensile and compressive strengths based on the present invention, to increase the strength and fatigue resistance of that part or end of the umbilical, without increasing the overall weight and cost of the remaining length.

With the embodiment of having such strength members, the present invention can provide an umbilical for use at a depth of greater than 2000 m, preferably going to 3000 m and beyond.

The umbilical of the present invention may further comprise one or more other longitudinal strength members, including known strength members.

The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements from any of the embodiments to describe additional embodiments.

BRIEF DESCRIPTION OF THE DRAWINGS

Embodiments of the present invention will now be described by way of example only, and with reference to the accompanying drawings in which:

FIGS. 4 and 5 are tables that list properties of several high strength and high modulus synthetic fibres suitable for forming rope for the present invention;

FIG. 6 is a table that lists properties of several commercial available products suitable for strength members, such as fibre rope and carbon fibre composition rod; and FIG. 7 a is table that lists properties of several high strength and high modulus ropes suitable for the present invention.

DESCRIPTION OF PREFERRED EMBODIMENTS

Figure 1:
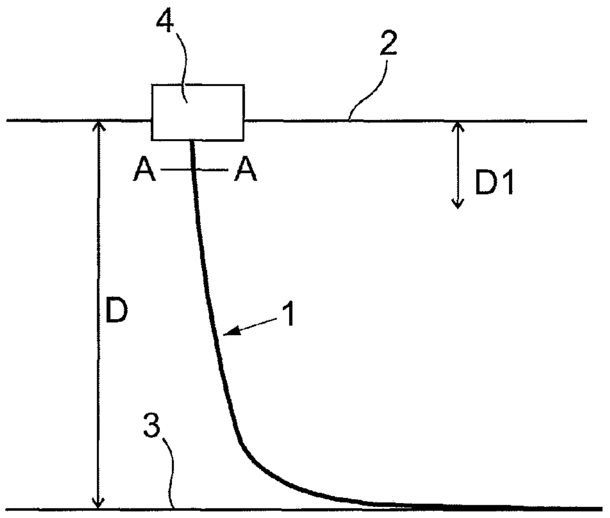
FIG. 1 is a schematic diagram of an umbilical according to an embodiment of the present invention in a subsea catenary configuration.

Referring to the drawings, FIG. 1 shows a schematic diagram of a first umbilical 1 in catenary configuration between a floating production unit 4 at a sea surface 2, or commonly at the 'topside', and a sea floor 3 or sea bed, with a depth D therebetween.

As is known in the art, the highest tensile and bending stresses are in the top section in the umbilical 1 as it approaches the floating production unit 4, shown in FIG. 1 by the section D1 of depth D. Traditionally, where the depth D is significant (such as >2000 m), load bearing members such as steel rods are provided along the whole length of the umbilical, generally to maintain ease of regular and constant manufacture.

However, whilst such load bearing members assist the tensile and bending stresses in the section D1, they become less useful, and therefor disadvantageous in terms of weight and cost, as the umbilical 1 continues towards the sea floor 3. The longer the umbilical, the greater the disadvantages are.

Furthermore, where the depth D is greater, certainly beyond 2000 m and even 3000 m and beyond, the weight of the heavy copper for the conducting cables further increases the need for stronger reinforcement at or near the floating production unit 4, to withstand the increasing suspended weight and the dynamic installation and operating loads.

Figure 2:
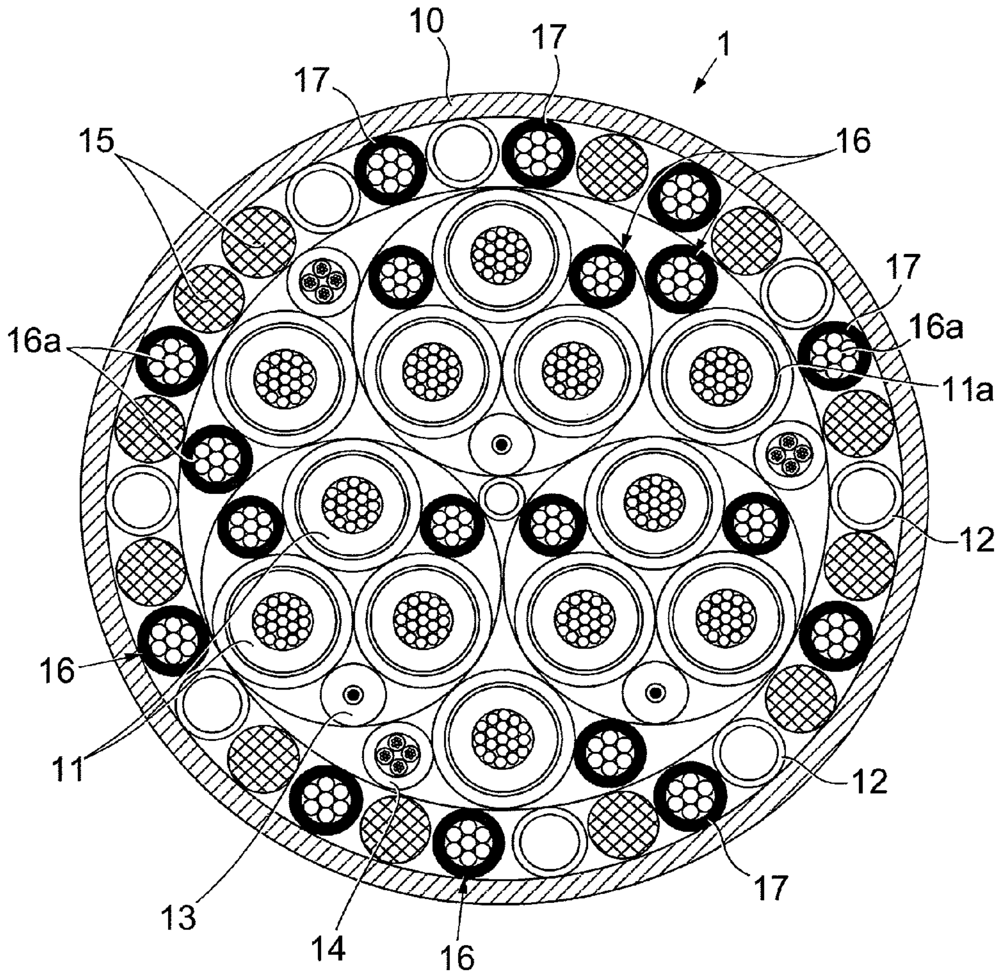
FIG. 2 is a cross-sectional view of the umbilical of FIG. 1 along line AA.

FIG. 2 shows a cross-sectional view of the umbilical 1 of FIG. 1 along line AA. In the example of a power riser umbilical, the umbilical 1 comprises three large power conductors, each having three electrical power cables 11 therein, which, with three other separated power cables 11*a*, makes twelve power cables in all. In addition, there are eight tubes 12, three optical fibre cables 13 and three electrical signal cables 14.

Both within the power conductors mentioned above, and in the surrounding circumferential sections, are a number of rope strength members 16, comprising seven strands of Zylon® fibre forming a Zylon® rope 16*a*, covered by an extruded tube or polymer sheath 17 for corrosion and wear protection. These rope strength members 16 extend wholly or substantially the length of the umbilical 1.

In addition, there are a number of polymeric fillers 15 in the umbilical 1 shown in FIG. 2, which again are wholly or substantially constant along the length of the umbilical 1.

Such umbilicals can still be formed with conventional design and manufacture machinery and techniques, preferably by maintaining a constant outer diameter along the length of the umbilical, and preferably by the or each longitudinal strength member in the umbilical also having a constant outer diameter so as to maintain ease of its forming with the other elements of the umbilical in a manner known in the art.

The use of a tube or sheath 17 surrounding and enclosing the rope 16*a* to form longitudinal or rope strength members 16 may assist, especially during installation of the umbilical, whilst the rope 16*a* can take axial loads, without being affected by the marine environment. The tube 17 could assist maintaining the cross-sectional shape of the rope strength members 16 during loading, especially to meet radial stresses, whilst having the mechanical performance to meet high demands on strength, especially in deep water situations, and the environmental requirements including preventing aging, and fatigue resistance, temperature resistance and corrosion resistance.

The or each rope in the umbilical can be applied in various structures of the umbilical system for both of static and dynamic umbilicals or deep water applications as load carrying element(s). Such rope(s) have excellent strength at approximately the same load carrying capacity as a steel strength member, but the weight is reduced by about 10% (of the same sized steel product).

Thus, an umbilical strength rope member provides an option to use in deep or deeper water applications. Using this strength, the rope in the umbilical can improve the tensile capacity of an umbilical, and so allow installation and continuous dynamic use in deeper sea water; it also can reduce the stress/strain level of other components, such as the steel tubes and cables within an existing umbilical system, which results in a longer service life than a conventional umbilical.

EXAMPLE

Figure 3:
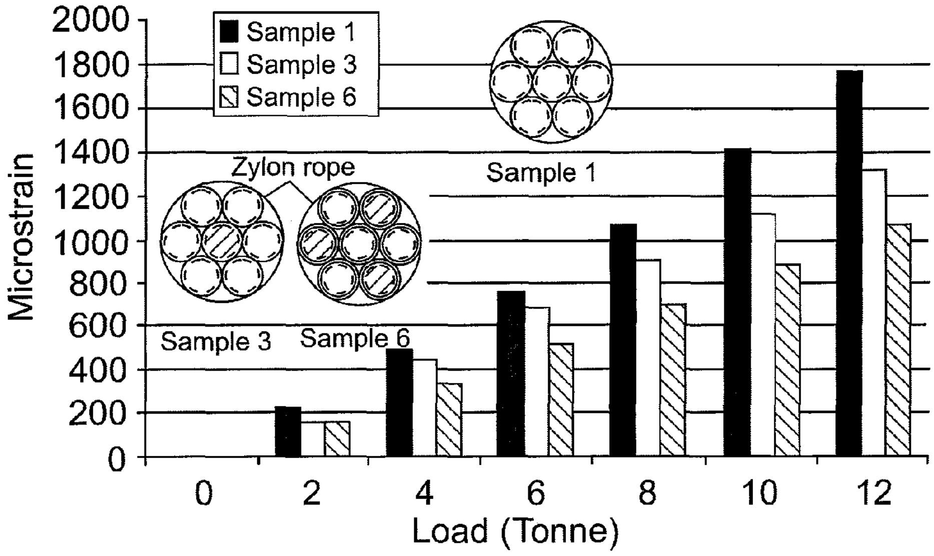
FIG. 3 is a graph of a comparison of three umbilicals.

FIG. 3 is a graph of strain comparisons on three umbilicals, Samples 1, 3 and 6, at different loads (stresses). Sample 1 has seven conventional steel tubes. FIG. 3 shows that under same load levels, adding even just one OD14.35 mm Zylon® rope in the umbilical structure (Sample 3) reduces the strain level by approximately 15-20%. By adding of three OD14.35 mm Zylon® strength ropes (Sample 6) into an umbilical structure, the strain levels at each load level are even further reduced, confirming that such rope-strengthened umbilicals can work in 2000 m water depths and beyond, whilst the conventional design (Sample 1) without the strength ropes addition could only work in 1000 m water depth.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiments.

What is claimed is:

1. An umbilical comprising a plurality of longitudinal strength members, wherein at least one longitudinal strength member comprises a rope comprising aromatic heterocyclic polymer fibers (PBO) having a tensile modulus 180 GPa, and wherein said rope is enclosed in a polymer sheath.

2. An umbilical as claimed in claim 1, wherein the rope has a strength to weight ratio of at least $1.0\times10^6$ Nm/kg.

3. An umbilical as claimed in claim 1, wherein the rope comprises Zylon®.

4. An umbilical as claimed in claim 1, wherein the PBO fibers have a tensile modulus >200 GPa.

5. An umbilical as claimed in claim 1, wherein the rope further comprises other high strength organic fibers.

6. An umbilical as claimed in claim 5, wherein one or more of the rope strength members is formed from fibers different from one or more other rope strength members.

7. An umbilical as claimed in claim 1, wherein each rope further comprises one or more of the materials of the group comprising: aromatic polyamide (aramid) fiber, aromatic polyester fiber, liquid crystal fiber, and high performance polyethylene fiber.

8. An umbilical as claimed in claim 1, configured for use at a depth of greater than 2000 m.

9. An umbilical as claimed in claim 1, further comprising one or more solid longitudinal strength members.

10. An umbilical as claimed in claim 1, wherein the umbilical is a riser.

11. An umbilical as claimed in claim 1, wherein the umbilical is a power riser.

* * * * *